United States Patent [19]
Gotz

[11] 3,990,962
[45] Nov. 9, 1976

[54] ELECTROLYTIC CELL DEVICE
[76] Inventor: Friedrich Götz, Tulpenweg 15, 5628 Heiligenhaus-Isenbugel, Germany
[22] Filed: Sept. 26, 1974
[21] Appl. No.: 509,570

[30] Foreign Application Priority Data
Oct. 1, 1973  Germany............................ 2349286

[52] U.S. Cl.............................. 204/268; 204/272; 204/278
[51] Int. Cl.² ...................... C25B 1/02; C25B 1/04
[58] Field of Search .......... 204/254, 260, 267, 268, 204/272, 274, 278

[56] References Cited
FOREIGN PATENTS OR APPLICATIONS
683,796  11/1939  Germany ........................... 204/260
416,900  9/1934  United Kingdom................ 204/260
454,915  10/1936  United Kingdom................ 204/272
430,477  6/1935  United Kingdom................ 204/260

Primary Examiner—John H. Mack
Assistant Examiner—A. C. Prescott
Attorney, Agent, or Firm—Ralf H. Siegemund

[57] ABSTRACT

Plural concentric, tubular electrodes are disposed in a cylindrical pressure vessel to establish therein plural, at least, partially serially connected cells in radial, spaced-apart relation. The tubular electrodes are either mounted in an insulative bottom layer of the vessel, or when closed at their lower axial ends, are nested with spacers inbetween. Various provisions are made for cooling and for equalizing the electric current density in the several cells or the volume of the cells is kept similar.

10 Claims, 4 Drawing Figures

ELECTROLYTIC CELL DEVICE

BACKGROUND OF THE INVENTION

The present invention relates to improvements in multi-cell devices for electrolysis of water by means of d.c. current. The present invention relates particularly but not exclusively to improvements in the type of device as shown in German printed patent application P 2159246 wherein the lower portion of a common container holds such plural cells which are open at their respective top and are electrically connected in series, whereby common anode-cathode electrode sheets with proper insulation divide the electrolytic liquid into the several cells.

SUMMARY OF THE INVENTION

It is an object of the present invention to improve on the structure of such multi-cell electrolysis device for purposes of simplifying manufacture and of improving the head conduction out of the device so that steady load can be increased.

In accordance with the preferred embodiment of the invention it is suggested to provide the electrodes as an assembly of concentric spaced-apart tubes having their bottoms (one axial end) mounted in insulated relation to each other and to the bottom of a tubular or cylindrical container or vessel, so that annular-cylindrical cells are established with serial connection between two cells which share one of the tubes as electrode, anode for one, cathode for the other cell. The cells have preferably the same volume either by decreasing the radial width of the cells with increasing diameter or by decreasing the axial length or a combination of both. Choosing decreasing axial length is particularly beneficial also for equalizing current density among the several electrodes.

The several tubes, when open ended can be mounted in a common insulating layer at the bottom of the container or vessel for insulative separation from each other and from the vessel. The latter will preferably be used as the outermost electrode. In an alternative configuration tubes with one closed end and bottom can be used in pot like configuration, and these pots are nested with insulative spacers inbetween, the largest pot being actually the vessel. In this case also the bottoms of these pots serve as electrodes.

In order to increase current density active cooling is provided for, for example by closing off the innermost electrode tube from any electrolytic liquid and passing a coolant therethrough instead. Alternatively one can extend the innermost electrode in places by insulated lead through, through the vessel and provide for cooling vanes so as to extract thermal energy from the inner portion of the multi-cell arrangement.

DESCRIPTION OF THE DRAWINGS

While the specification concludes with claims particularly pointing out and distinctly claiming the subject matter which is regarded as the invention, it is beliieved that the invention, the objects and features of the invention and further objects, features and advantages thereof will be better understood from the following description taken in connection with the accompanying drawings in which:

Proceeding now to the detailed description of the drawings, FIG. 1 illustrates a cylindrical pressure vessel 50 with a flange 50a having four bores for fastening of a lid or cover (not shown, but see cover 84 per se in FIG. 4). An O-ring seal 51 is disposed on the flange for sealing against the cover when boolted bolted the vessel. L shaped mounting brackets 63, 64 are welded to the side of the vessel 50 for mounting it in an appropriate frame, foundation etc.

Figure 2:
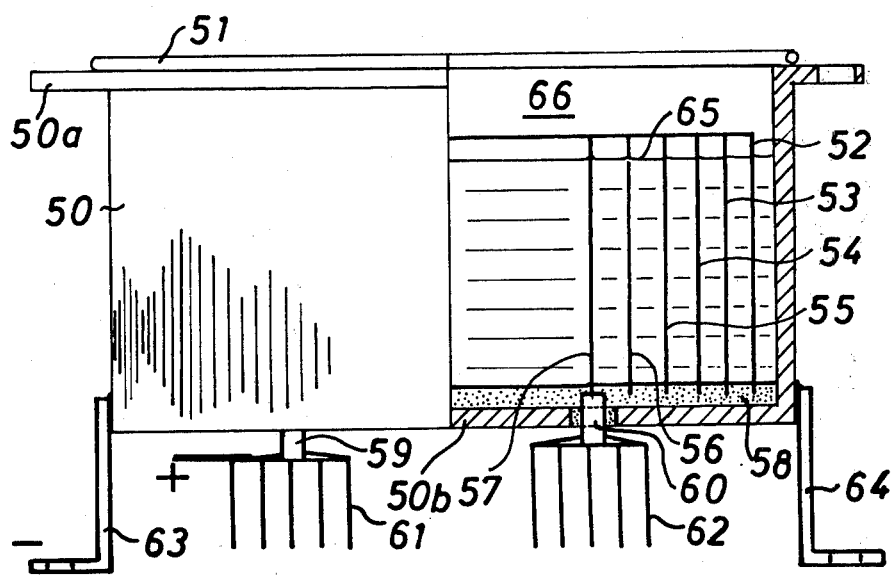
FIG. 2 is a partial side view with section along line AB in FIG. 1.

The vessel contains a plurality of concentrically arranged, tubular electrodes designated in the order of decreasing diameter by reference numerals 52 through 57. These electrodes are electrically insulated with respect to each other as well as against the vessel 50. Particularly here (FIG. 2) the lower edges of these tubes are all embedded in an insulating layer 58 on the bottom of vessel 50. Since the tubes do not traverse the layer 58 entirely they are also insulated with respect to vessel 50. Layer 58 is preferably made of a mixture epoxy resin and finely ground quartz powder.

The innermost electrode 57 is provided with insulated through connectors 59, 60 leading to heat dissipating vanes 61, 62. Insulation is necessary here because for reasons of good thermal conduction elements 60 and 62 are preferably made of metal, preferably copper. The through connections through the vessel bottom should also be gas tight. The vanes 61, 63 should be subjected to the air flow of a blower to obtain forced cooling.

The cylindrical space between vessel 50 and outermost electrode 52, as well as the several concentric spaces between each two electrodes facing each other across such a ring space, define the cells whereby each tube separates two cells. There are, accordingly six such cells in the assembly. That number is, of course, not critical.

All cells are filled with electrolyte, e.g. water and potash lye, up to level 65 which is below the upper edge of each tube. The interior space of tube 57 is not a cell and, therefore, does not have to be filled with electrolytic liquid. It was found advantageous, however, to use that space for storage of such liquid to be used when the working liquid level in the cells begins to fall low.

It can be seen, that the radial distance between two adjacent tubes, i.e. the radial widths of the cells decreases with increasing diameter. That change in diamension is chosen so that the volume of all cells is at least approximately the same.

Two portions of the assembly are respectively designated additionally by + and − to indicate the connection of a d.c. voltage source. Rather simply, one of the mounting brackets and one of the cooling vanes adequately serve that purpose, whereby the vessel is preferably negative against the innermost electrode, 57. It appears, that by virtue of that assembly all cells are serially interconnected whereby each of the tubes serves additionally as series connector between two cells. Current flows from the innermost electrode through all cells to the vessel. The hydrogen and oxygen produced is collected in mixed consistency in the collecting chamber 66 between liquid level 65 and lid.

Figure 4:
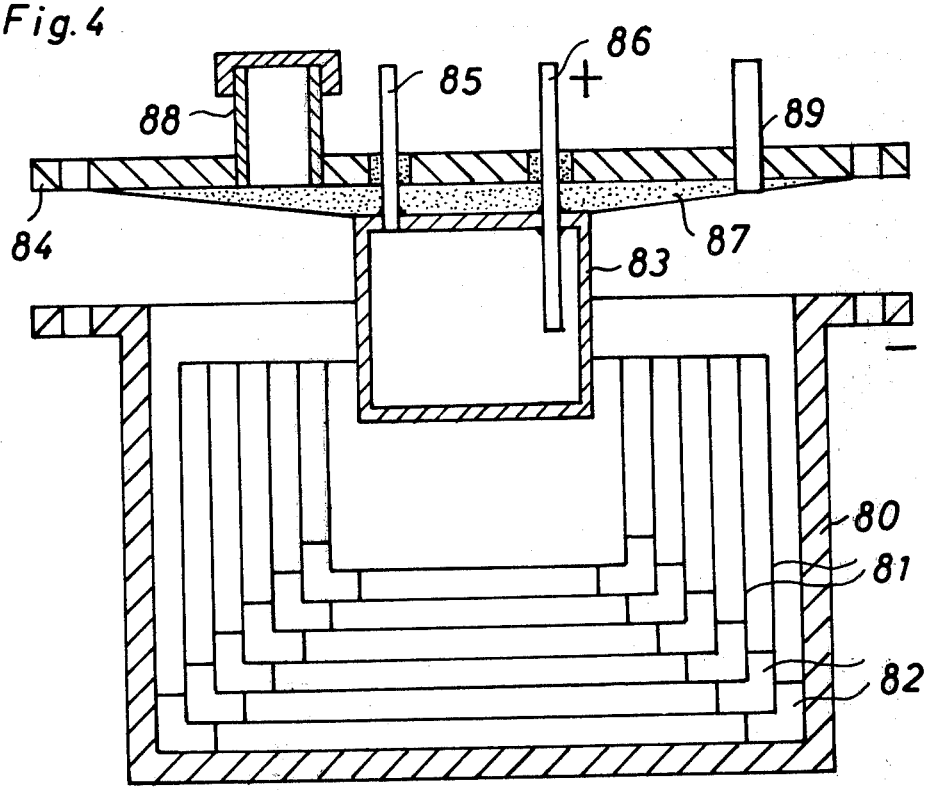
FIG. 4 is a vertical section view through another modified example of the preferred embodiment.

The lid or cover should have a discharge opening or outlet for such gas (see 89 in FIG. 4).

Assuming that the electrodes are made of iron, one will need 15 volts (3 volts per cell) for operating this six cell arrangement. Nickel electrodes require 25 volts d.c. Vessel 50 is preferably made of deep-drawn steel; however, in the case of nickel electrodes a nickel lining on the inner wall of the vessel where exposed to the liquid is needed.

Since the innermost electrode 57 has smallest diameter and surface, electric current density is highest here. Thus, the maximum permissible current flow is determined by the dimensions of that innermost electrode. Also, the heat dissipation is carried out from that electrode for that reason.

The vessel and the space 66 should be as small as possible for reasons of low height and also for reasons of safety. Thus, the distance between the electrodes should be between 6 and 12 mm (about one quarter to one half of an inch). Large power density may require additional provisions for removal of thermal energy. A considerable amount of heat escapes through the outer wall of the vessel, particularly because the electrolyte is in direct contact with the metal of the vessel. Thus, a temperature gradient and heat flow exists in radial outward direction through the interior of the vessel. The vanes 61 and 62 may not reverse that gradient near the central portions but definitely reduce its steepness.

The multi-cell assembly as described is rather easy to manufacture because the tubular electrodes can be mounted and secured to the bottom of vessel 50 rather simply and without special tooling, only concentricity should be observed, but the tubes can be stuck into the resin when still soft, prior to curing, and upon hardening of the resin to form layer 58, the tubes are mounted therewith.

Also, the potential drop through layer 58 increases in graduated steps so that there are not local peaks and, thus, results in no insulation breakdown problem. Moreover, no electric creepage and leakage paths exist anywhere through the insulator 58 as the latter is embedded, so to speak, by and in the rather well conducting electrolytic liquid.

Figure 1:
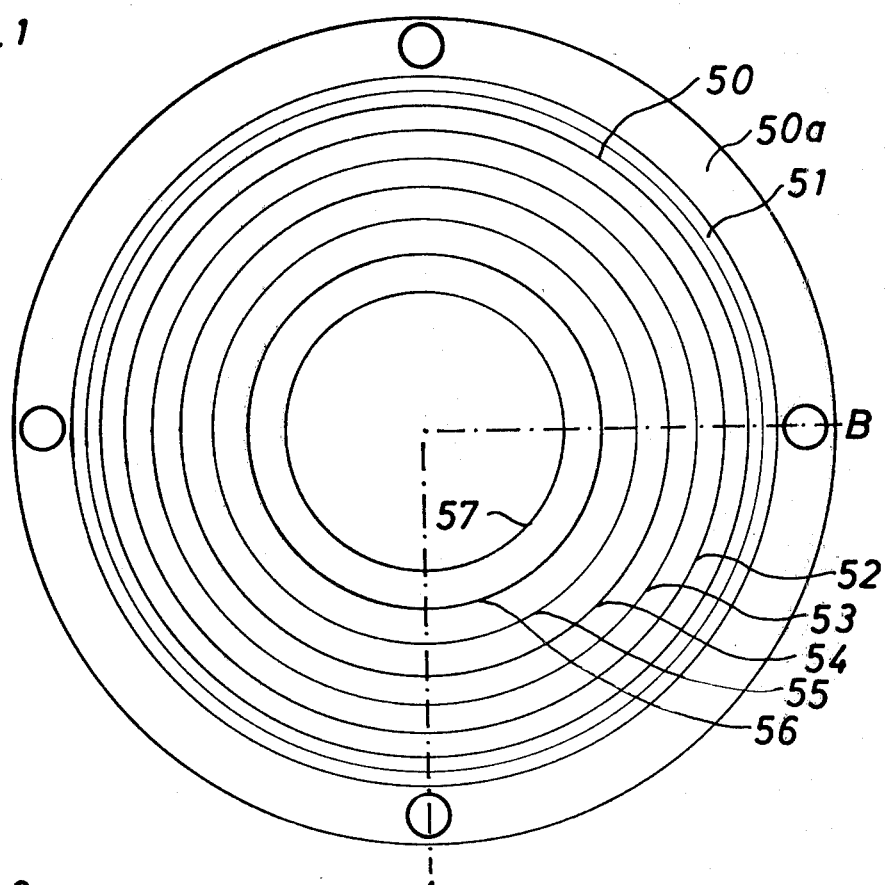
FIG. 1 is a top view of a multi-cell assembly in accordance with the preferred embodiment of the invention.

The bottom of vessel 50 is shown in FIG. 1 in planar configuration. However commercially available pressure vessels often have curved bottoms for reason of enhanced stability. This curvature can be taken advantage of by using inner electrodes which are longer (axially) than the electrodes closer to the cylindrical periphery. The immediate advantage here is that the current density can be equalized. This is particularly shown in FIG. 3, showing the optimum in this respect in form of a spherically curved bottom of such a vessel 70.

Figure 3:
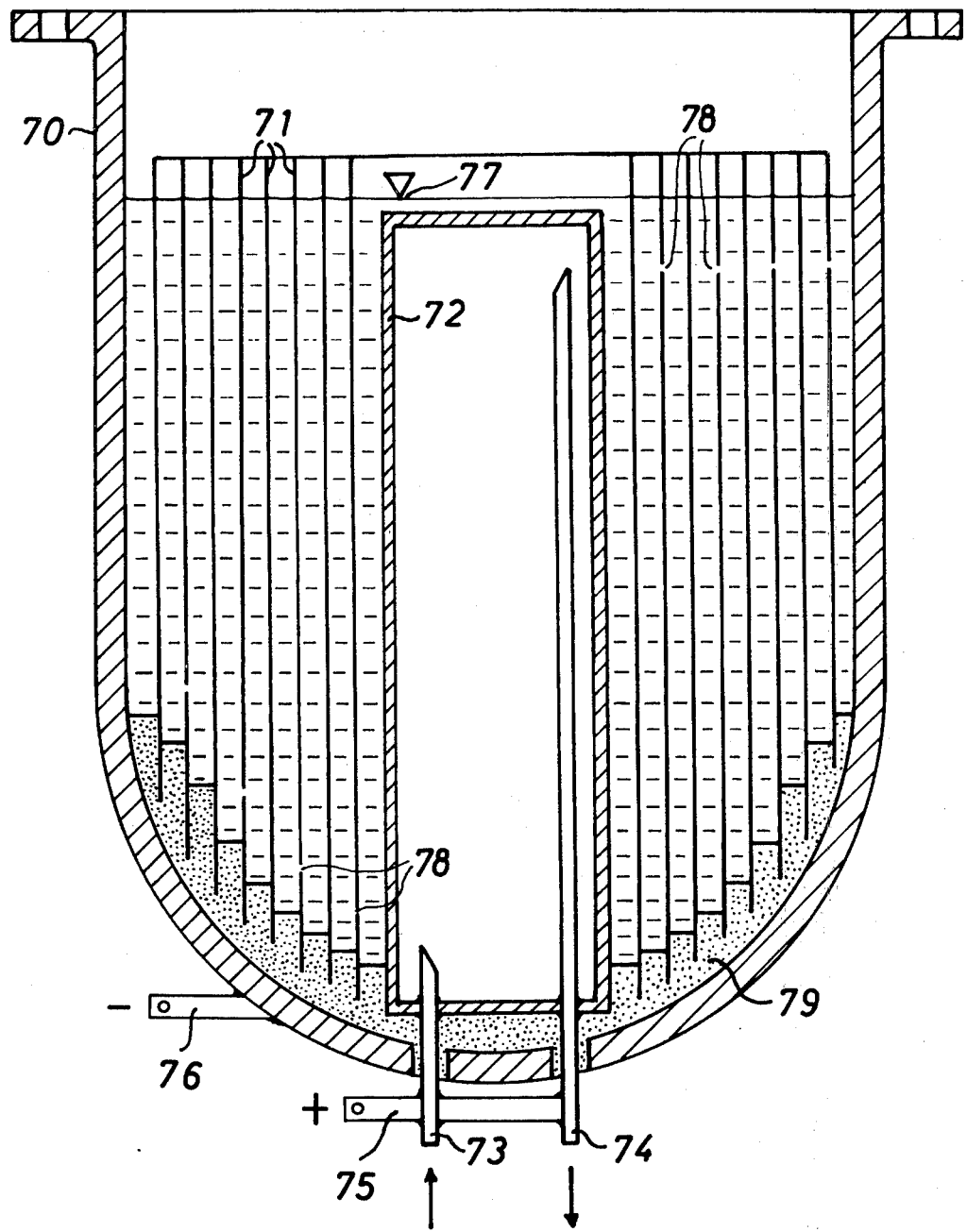
FIG. 3 is a vertical section view of a somewhat modified example of the preferred embodiment.

The assembly of FIG. 3 shows eight concentric, tubular electrodes 71 in a deep drawn vessel 70. The upper edges of all electrodes are horizontally aligned (which is not too important except for ease of assembly, the effective horizontal alignment of the upper cell end comes from the same level 77 of electrolytic liquid). However, the tubes are longer in the interior of the vessel and it appears that the product of effective length and circumference can be kept constant; that in turn permits radially equidistant spacing of the electrodes.

A ninth electrode 72 is constructed as a hollow cylinder which is closed at top and bottom, but the bottom is traversed by two tubes 73, 74 respectively serving as inlet and discharge of a coolant caused to circulate in that manner inside of cylinder 72.

The lower ends of electrode tubes 71 and also of cylinder 72, and the passed through ducts 73 and 74 are all embedded and cast in the epoxy-powder quartz layer 79. Thus, all of the metal parts are insulated from each other and from vessel 70. Conveniently one can use the ducts 73, 74 as current inlets and for the connection to the positive pole of the d.c. driving source; a bar 75 provides for this interconnection. Negative potential is applied to the vessel 70 via a bar 76.

It can thus be seen, that the cylindrical portion of vessel 70 is the outer cathode and the cooled cylinder 72 is the inner anode. There are, accordingly, altogether nine series connected, concentric electrolytic cells and the casting 79 has been carried out to have gradually lower bottoms in the outer cells so that the area of electric current flow between the electrodes is about the same. Of course, the liquid in the cells, though equal in quantity initially and also being consumed at similar rates, will assume lower levels in the inner cells than in the outer ones. This, however, does not disturb operation as current density remains still the same.

Initially, level 77 is just about in the level of the top of cylinder 72. In other words, the liquid is filled into the cells up to a level so that for equal volume of liquid in the cells that level is the same. The inlet for electrolytic liquid and water can be mounted in the lid (not shown) and should be located excentrically so that the added water will be distributed immediately into several cells. Small openings 78 cause liquid equalizations throughout the system. These openings may have 1 to 3 mm diameter. If all these openings were staggered by 180° from cell to cell, the current flow through this shunt path is extended and its effect remains negligibly small. In addition one could stagger these bores as to height.

If such bores were not provided for, one needed merely to tilt the vessel a few times to equalize the liquid levels in the several cells. Also, water and electrolyte will be uniformly mixed in this manner. The vessel should be tilted here by about 30° to 45°.

The plastic-insulative layer 79 should be made here in steps, beginning with the innermost portion to seat and anchor the assembly 72–73–74. The material should not be completely hard but be quite stiff before the next tube is inserted and cast in separately. Casting and embedding, and gradual buildup of layer 79 proceeds from the center to the periphery so that each portion that is completed supports the next one on the increasingly steep bottom as it merges with the cylindrical wall of vessel 70.

Alternatively one could first mount the tubes and seal them by means of sponge rubber rings and place them accurately in position in vessel 70. These rings would be placed at what will become the bottom level of the cells. The vessel is then turned upside down to rest on the flange on the (normal) top. Next, casting resin is poured through the openings left for the ducts 73 and 74, and the resin-quartz mixture will readily fill all cavities. After hardening the rubber rings may be removed, but that may not be necessary.

It was found, that such a pressure vessel with curved bottom and interior cooling permits quite a high power throughput, as the current density does not have to be rated on any minimum surface area.

Generally speaking, another way of equalizing the electrode areas of the different cells in a concentric arrangement is to use $2n + 1$ tubular electrode for $2n$ cells, the electrodes having the same height and are radially apart by the same distance from cell to cell. That assembly is cast in a planar bottom (or near planar bottom) of a container. The innermost electrode is then electrically conductively connected to the bottom of the pressure vessel while the electrode in the center of the assembly is connected to the opposite polarity with insulated connector. Additionally, tubes of the same potential should be electrically interconnected to obtain equalization of current density throughout.

In such an assembly, current flows from this central electrode in radial outward direction, towards the wall of the vessel, as well as radially inward towards the innermost electrode which is also connected to the vessel. This then is in effect a series-parallel connection of $2n$ cells under formation of $n$ cell pairs which together have the same electrode area throughout; This way constant current density is obtained under utilization of the entire interior of the vessel for the development of gas.

The current lead for the anode can also be proportioned here to be over dimensioned as the electric current rating to utilize the heat flow in copper for removal of large quantities of heat.

Removal of thermal energy can be enhanced further and in either example by constructing one or several of the tubular electrodes as twin wall tube with spacing between the walls, and liquid coolant is fed into such interior wall spacing. The feeding and discharged ducts must also be run through the vessel bottom as explained above. In the example of a radially divided current path that middle tube can be so constructed in which case the coolant ducts may serve as leadins for current flow to the anodes. Parallel or series connection of coolant circulation for several fluid cooled electrodes of different potential is permissible only if the coolant is an electrically insulating fluid.

Turning now to FIG. 4, the example shown herein shows several nested pot-like electrodes 81 seated into each other but spaced apart by means of angular spacers 82 made of insulating material. The vessel 80 is the outer pot and constitutes the outer cathode. The innermost anode is a closed hollow cylinder 83 suspended from the lid 84 and attached thereto by insulating layer 87.

Ducts 85 and 86 are insulatively passed through lid 84 to feed and discharge coolant to and from the interior of cylinder 83. Again, ducts 85, 86 are used as current leads for the innermost anode. The insulation covers the entire interior surface of lid 84 so as to extend any leakage path therein.

Reference numeral 88 refers to the liquid inlet through which electrolyte and water is fed to the vessel. Gas is discharged through a small pipe 89 in the lid. Side walls and bottoms of the several electrode tubes with one closed end are all actively participating in the formation of gas. Thus, all bottoms should be slightly convexly curved so that any gas bubbles that may form do not grow too large.

In this example, it has to be taken into consideration that the total surface of the innermost pot is considerably smaller than the active surface of the outermomst pot, because each has a participating bottom. The largest permissible current is, therefore, proportioned on the smallest electrode. Thus, a power optimum is available here on account of the rather large cylinder 83 as it is actively cooled.

In all cases cooling ducts in form of copper tubing helices would be mounted on the outside of the vessel and fastened thereto through dip tinning or epoxy bonding. A still further cooling of all surfaces can be obtained by welding the pressure vessel (50, 70, 80) into a larger, cylindrical container, with welding along the vessel flange. The gap between the vessel and the larger container is then flown through by a coolant. If water is used as coolant one will need insulation for all the current leads.

The invention is not limited to the embodiments described above but all changes and modifications thereof not constituting departures from the spirit and scope of the invention are intended to be included.

I claim:

1. Electrolysis device with plural electrolytic cells, comprising:
    a vessel with cylindrical wall and discharge outlet for gas;
    a plurality of concentrically arranged tubular electrodes, disposed in the vessel and concentric thereto, and defining plural annular concentric cells, each being open at the top so that a collecting chamber for a mixture of hydrogen and oxygen is defined above all of said cells in the upper portion of the vessel serving as collection chamber for a gas mixture to be discharged from the chamber via said outlet, the the annular cells being adapted to be filled with electrolytic liquid whereby each tube serves as anode of one and cathode of the radially next cell; and
    insulating means for embedding bottom portions of the tubular electrodes thereby mounting the electrodes in relation to each other and to the vessel.

2. Device as in claim 1, the vessel having a bottom provided with an insulating layer, the lower ends of the tubes being open, but embedded in said layer to close each tube at the bottom thereby closing the bottoms of the ring spaces.

3. Device as in claim 2, wherein the vessel has a flat bottom, the radial spacing between respective two adjacent ones of the tubes decreasing in radial outer direction.

4. Device as in claim 2, wherein the vessel has a curved bottom, the tubes differing in length and being equidistantly spaced in radial direction.

5. Device as in claim 1, wherein the innerost tube is closed at its bottom, and means for feeding coolant to the innermost tube and discharging coolant therefrom.

6. Device as in claim 1, wherein all tubes are closed at the bottom and nested into each in spaced-apart relation, with insulating spacers inbetween serving as the said insulating means.

7. Device as in claim 6, and including a lid on the vessel, the innermost tube being closed and suspended from the lid, and passed through by a coolant.

8. Device as in claim 1, wherein the vessel is the outermost electrode to be connected to one terminal of a voltage source, and means for providing for insulated current lead-in to one of the tubes in the vessel.

9. Device as in claim 6, said bottoms being flat, the spacers being of angular configuration.

10. Device as in claim 1, the tops of the electrode tubes being in a common plane.

* * * * *